(12) United States Patent
Geiger

(10) Patent No.: US 7,774,905 B2
(45) Date of Patent: Aug. 17, 2010

(54) ELEMENT OF A CABLE TIE STRAP

(75) Inventor: Gerard G. Geiger, Jackson, WI (US)

(73) Assignee: HellermannTyton Corporation, Milwaukee, WI (US)

(*) Notice: Subject to any disclaimer, the term of this patent is extended or adjusted under 35 U.S.C. 154(b) by 205 days.

(21) Appl. No.: 11/707,174

(22) Filed: Feb. 14, 2007

(65) Prior Publication Data

US 2008/0189916 A1 Aug. 14, 2008

(51) Int. Cl.
*B65D 63/10* (2006.01)
(52) U.S. Cl. .................... 24/16 PB; 248/74.3
(58) Field of Classification Search ............ 24/16 PB, 24/16 R, 30.3 P, 17 A, 17 AP; 248/74.3
See application file for complete search history.

(56) References Cited

U.S. PATENT DOCUMENTS

| | | | |
|---|---|---|---|
| 3,605,199 A | 9/1971 | Eberhardt | |
| D224,960 S | 10/1972 | Wilson | |
| 3,949,449 A | 4/1976 | Caveney et al. | |
| 3,965,538 A | 6/1976 | Caveney et al. | |
| 4,875,647 A * | 10/1989 | Takagi et al. | 248/74.3 |
| 4,993,669 A | 2/1991 | Dyer | |
| 5,102,075 A | 4/1992 | Dyer | |
| 5,131,613 A * | 7/1992 | Kamiya et al. | 248/74.3 |
| D330,324 S | 10/1992 | Solbeck | |
| 5,337,983 A | 8/1994 | Mailey | |
| D372,665 S | 8/1996 | Kim | |
| 5,732,446 A | 3/1998 | Blanks | |
| 5,774,944 A | 7/1998 | Choi | |
| 5,820,083 A | 10/1998 | Geiger | |
| 5,836,053 A | 11/1998 | Davignon et al. | |
| 5,890,265 A | 4/1999 | Christian et al. | |
| 5,921,510 A | 7/1999 | Benoit et al. | |
| 5,926,921 A | 7/1999 | Benoit | |
| 5,966,781 A | 10/1999 | Geiger | |
| D417,142 S | 11/1999 | Kim | |
| D417,387 S | 12/1999 | Kim | |
| D417,838 S * | 12/1999 | Kim | D8/396 |
| 6,003,208 A | 12/1999 | Christian et al. | |
| D444,054 S | 6/2001 | Bernard et al. | |
| 6,240,602 B1 | 6/2001 | Geiger | |
| 6,463,427 B1 * | 10/2002 | Wu | 707/3 |
| D471,435 S | 3/2003 | Krisel et al. | |
| 6,550,723 B2 | 4/2003 | Fraley, II et al. | |
| 6,560,822 B2 | 5/2003 | Caveney et al. | |
| 6,718,597 B2 * | 4/2004 | Geiger | 24/16 PB |
| 6,745,439 B2 | 6/2004 | Brownlee et al. | |
| 6,807,714 B2 | 10/2004 | O'Young et al. | |

(Continued)

FOREIGN PATENT DOCUMENTS

GB 943240 12/1963

*Primary Examiner*—Amy J Sterling
(74) *Attorney, Agent, or Firm*—Ryan Kromholz & Manion, S.C.

(57) ABSTRACT

A low profile locking tie head having a reduced wall thickness is provided for use in conjunction with a flexible strap. The low profile head comprises a wall, which circumferentially defines an opening, a reinforcement rib attached to the wall, and a pawl mechanism disposed at least partially inside the opening. A pair of clamping rails preferably provides a complete clamping surface, lowers the required tie head height, and assists in the transfer of force to the reinforcement rib. Further, a tie head retainer is provided to allow secure connection to a predetermined support structure.

3 Claims, 15 Drawing Sheets

U.S. PATENT DOCUMENTS

| | | |
|---|---|---|
| D530,600 S | 10/2006 | Krisel et al. |
| 7,127,779 B2 | 10/2006 | Hewes |
| 7,131,168 B2 | 11/2006 | Pangalo |
| 7,437,804 B1 * | 10/2008 | Geiger et al. ............. 24/16 PB |
| 2008/0066265 A1 * | 3/2008 | Pilon et al. ................ 24/16 PB |

* cited by examiner

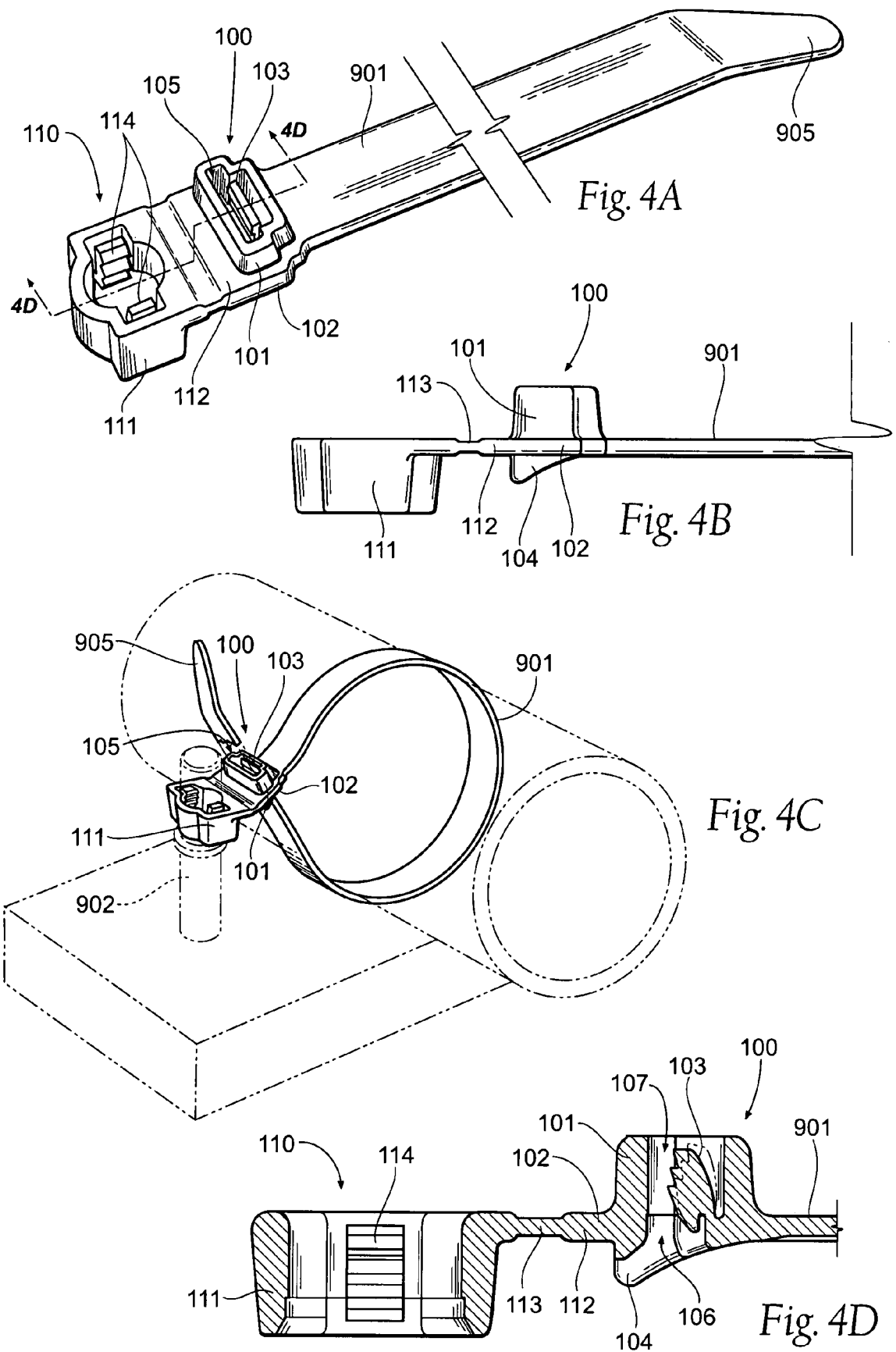

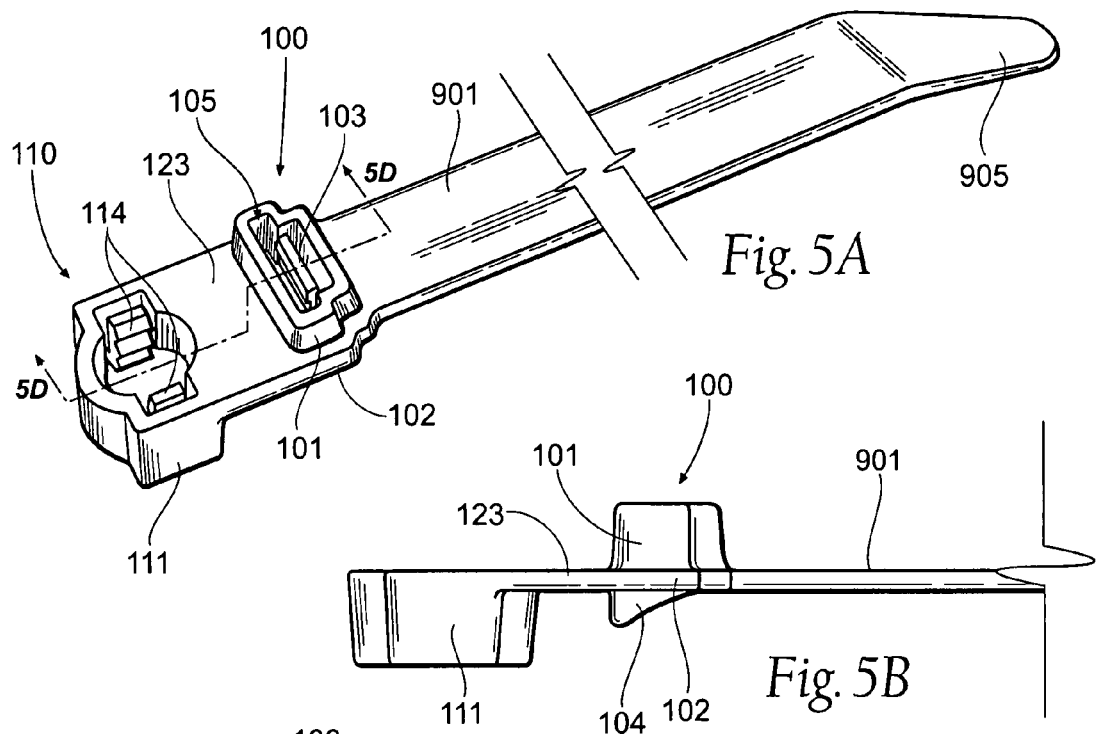
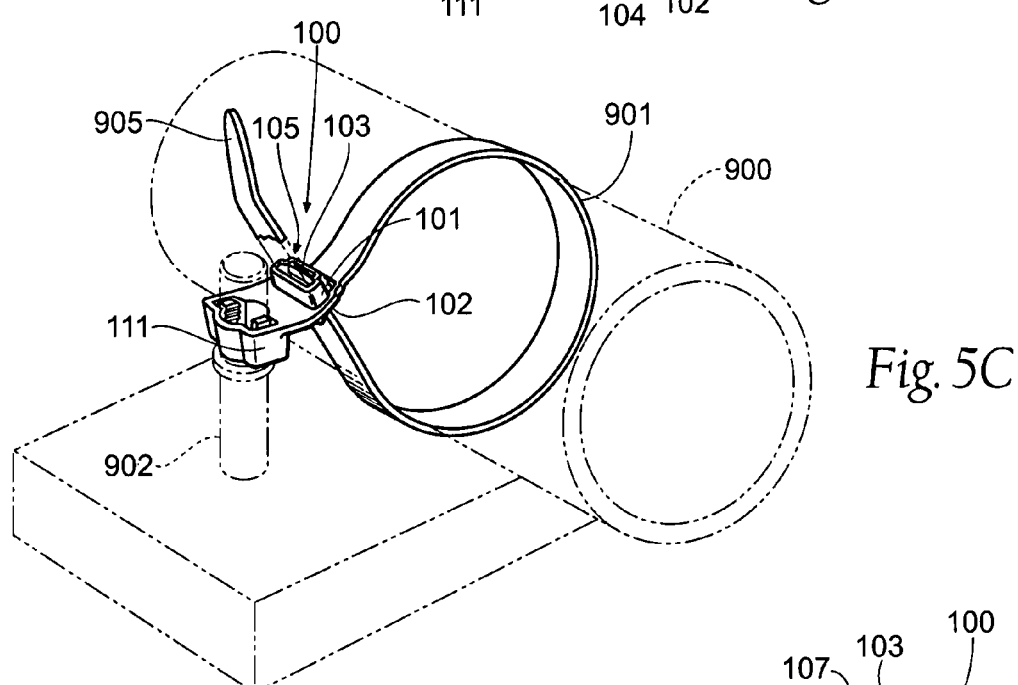
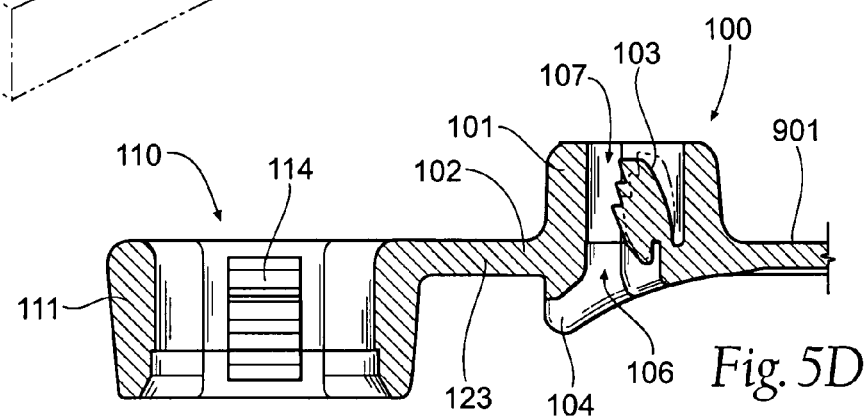

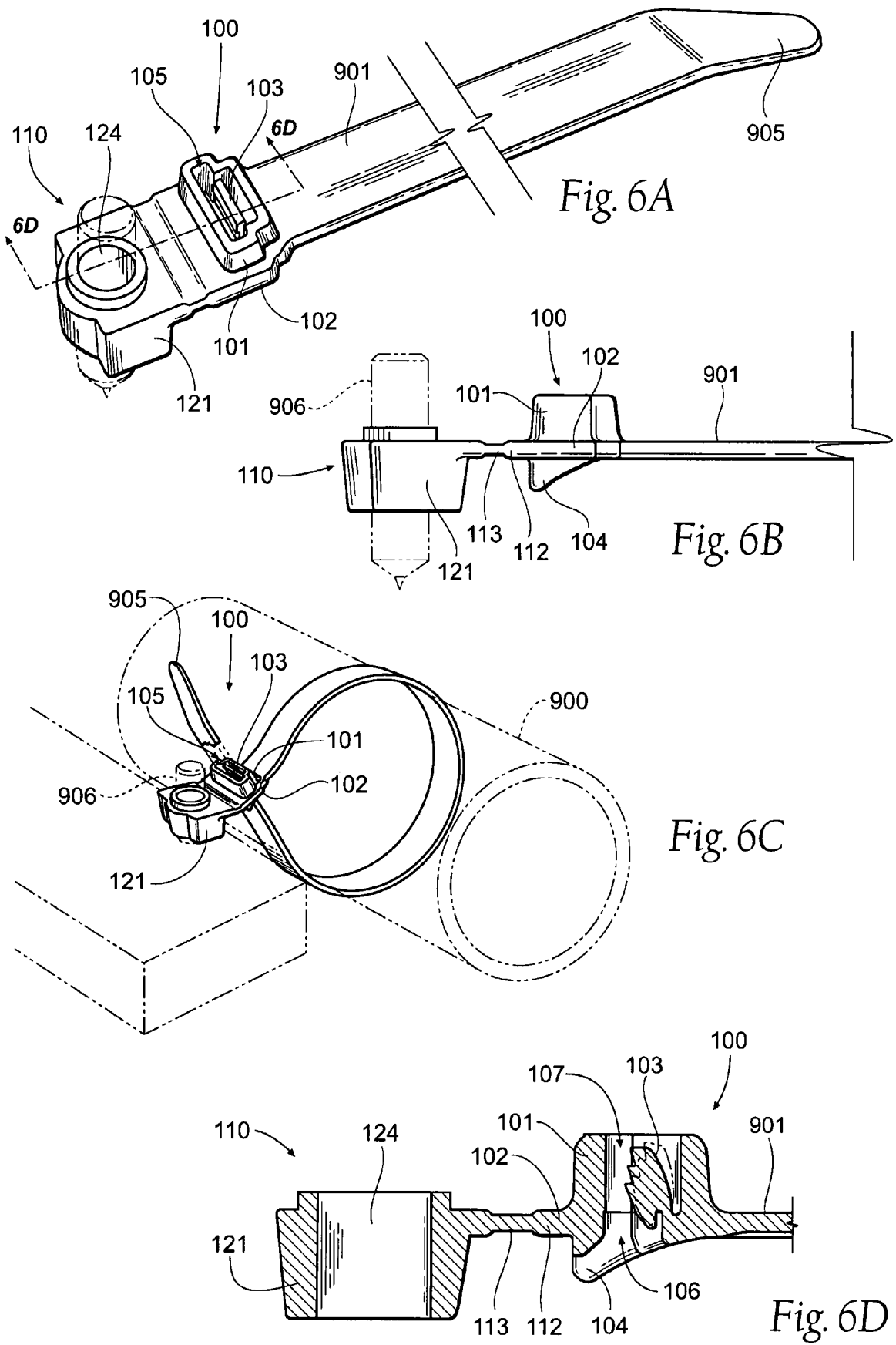

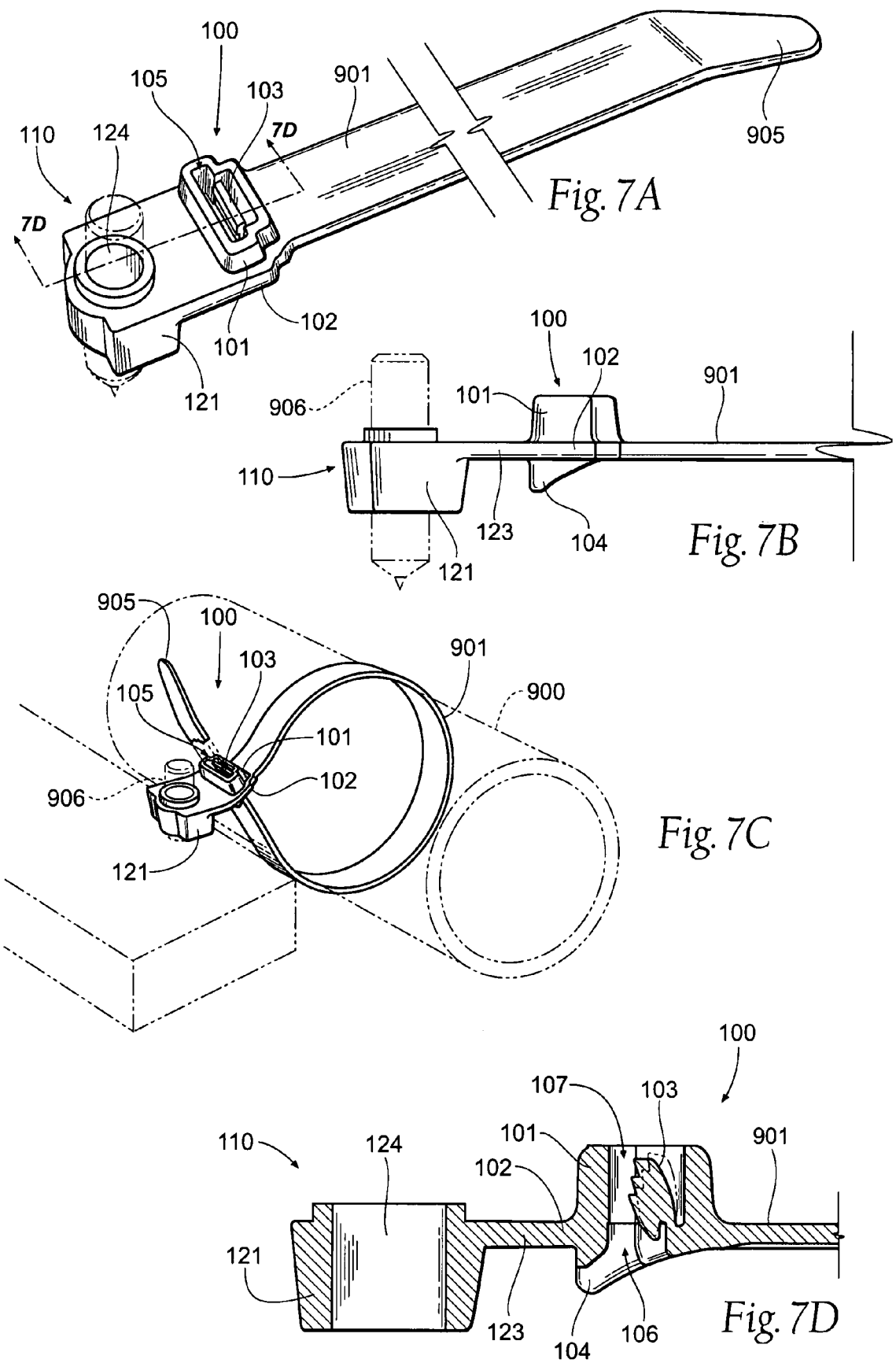

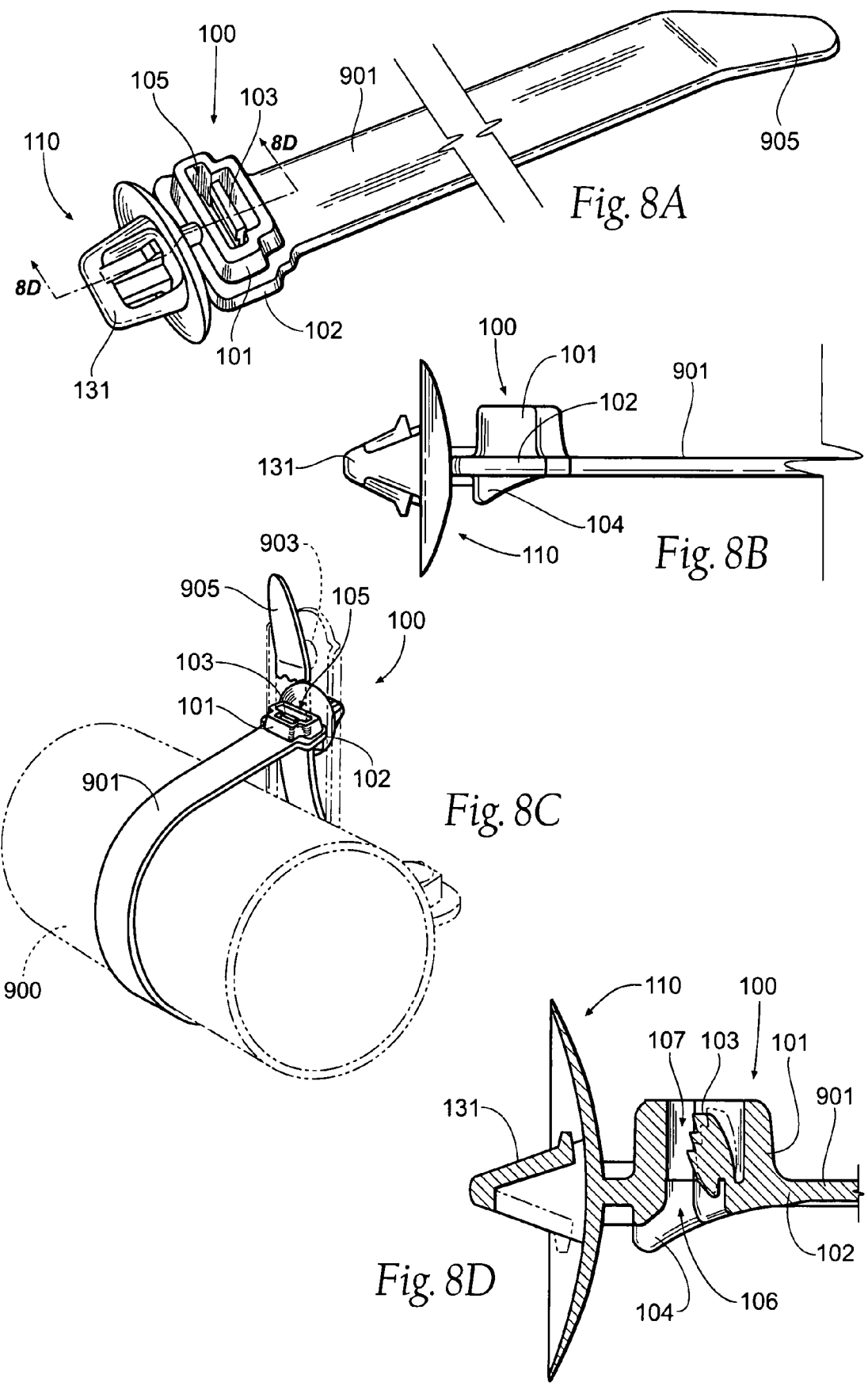

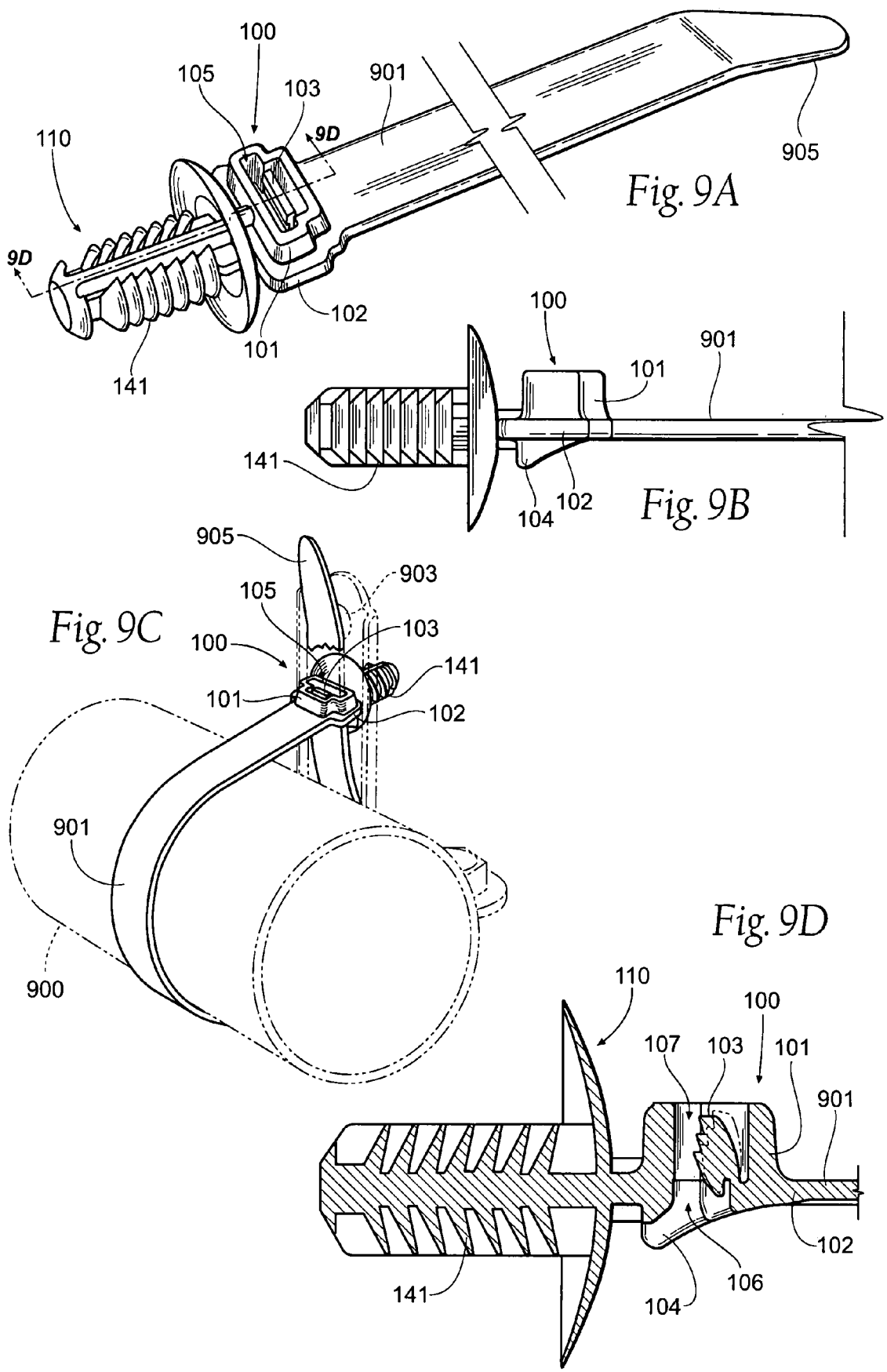

ELEMENT OF A CABLE TIE STRAP

RELATED APPLICATIONS

This application claims the benefit of U.S. Design patent application Ser. No. 29/263,127, filed 17 Jul. 2006, which is a continuation of U.S. Design patent application Ser. No. 29/216,331, filed 1 Nov. 2004.

BACKGROUND OF THE INVENTION

This invention relates to flexible ties and, more particularly, to a normal entry low profile locking tie head having a reduced cross-section sidewall thickness for use with a flexible tie.

Flexible ties for use in bundling elongated members such as wires, cables, etc. are well known. Typically, such ties include an elongated flexible strap made of suitable material. The tie usually has a free end (tail) and a locking head at the opposite end. The strap is flexible; the free end (tail) is capable of being looped 270 degrees around back toward itself and inserted into the locking head after which the diameter of the loop formed by the strap can be adjusted to fit in the desired manner over the intended bundle.

A normal entry tie head is a tie head wherein the insertion of the strap into the locking head and then its extension through the locking head is generally normal, perpendicular, or oblique to the strap, while the strap is in an unfastened, or generally planar orientation.

Various constructions of normal entry tie heads have been proposed. Primarily, such tie heads have been relatively bulky, thereby leading to at least three problems. First, processing cycle times of flexible straps having a locking head are driven by the cure time of the tie heads. That is, in any molded plastic product, the minimum cycle time is determined by the cure time of the most volumetric portion of the product. Therefore, it would be desirable to have a normal entry tie head having a reduced cure time, which would, in turn, decrease cycle time and increase the number of units produced in a given amount of time.

Second, previous tie head bulk provided undesirable obstruction in a variety of applications. Such heads would not allow passage of bundled items through wire looms, frame rails and channels. Furthermore, due to their protrusion from a bundle, such heads could cause injury to persons installing bundles or maintaining equipment containing the bundles. Finally, obstruction of previous tie heads affected the wire density in a given routing location. That is, since prior tie heads were bulky, the obvious protrusion of the head from the bundle would consume valuable routing space, which would otherwise be filled with wires or cables. Thus, it would be desirable to have a tie head that does not generally provide undesirable obstruction.

Third, previous tie heads comprised a significant amount of material. It would, therefore, be desirable to have a tie head that reduces the amount of material used, thereby leading to material cost savings.

SUMMARY OF THE INVENTION

The invention herein described provides all of the desirable features indicated in the Background of the Invention.

To achieve the desired characteristics, the low profile locking tie head of the present invention comprises a reduced amount of wall thickness while maintaining desired structural integrity. The reduction of the wall thickness allows for the shortening of production cycle time and further allows for material savings and desirable installation and maintenance characteristics.

The reduction of wall thickness and material is achieved by using a reinforcement rib, which is integrally formed with the low profile locking tie head wall. The reinforcement rib can be used alone or in connection with clamping rails on the underside of the tie head. Clamping rails allow an even greater reduction in head height, thereby reducing even further the protrusion from the surface of a bundle of objects.

BRIEF DESCRIPTION OF THE DRAWINGS

FIG. 4A is a perspective view of a second embodiment of the present invention.

FIG. 4B is a front elevation view of the embodiment of FIG. 4A.

FIG. 4C is a perspective view showing the embodiment of FIG. 4A in use.

FIG. 4D is a cross-section view taken along line 4D-4D of FIG. 4A.

FIG. 5A is a perspective view of a third embodiment of the present invention.

FIG. 5B is a front elevation view of the embodiment of FIG. 5A.

FIG. 5C is a perspective view showing the embodiment of FIG. 5A in use.

FIG. 5D is a cross-section view taken along line 5D-5D of FIG. 5A.

FIG. 6A is a perspective view of a fourth embodiment of the present invention.

FIG. 6B is a front elevation view of the embodiment of FIG. 6A.

FIG. 6C is a perspective view showing the embodiment of FIG. 6A in use.

FIG. 6D is a cross-section view taken along line 6D-6D of FIG. 6A.

FIG. 7A is a perspective view of a fifth embodiment of the present invention.

FIG. 7B is a front elevation view of the embodiment of FIG. 7A.

FIG. 7C is a perspective view showing the embodiment of FIG. 7A in use.

FIG. 7D is a cross-section view taken along line 7D-7D of FIG. 7A.

FIG. 8A is a perspective view of a sixth embodiment of the present invention.

FIG. 8B is a front elevation view of the embodiment of FIG. 8A.

FIG. 8C is a perspective view showing the embodiment of FIG. 8A in use.

FIG. 8D is a cross-section view taken along line 8D-8D of FIG. 8A.

FIG. 9A is a perspective view of a seventh embodiment of the present invention.

FIG. 9B is a front elevation view of the embodiment of FIG. 9A.

FIG. 9C is a perspective view showing the embodiment of FIG. 9A in use.

FIG. 9D is a cross-section view taken along line 9D-9D of FIG. 9A.

DESCRIPTION OF THE PREFERRED EMBODIMENT

Figure 1A:
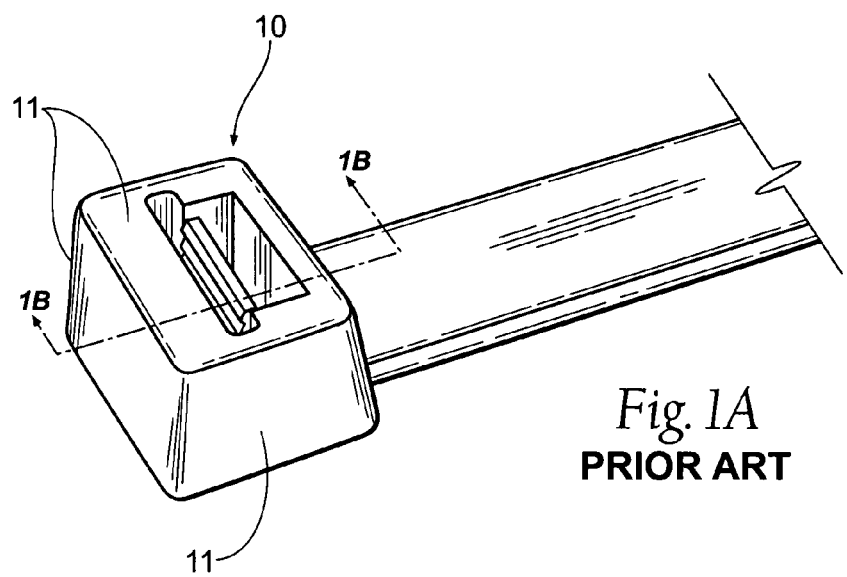
FIG. 1A is a perspective view of a prior art locking tie head.
Figure 2A:
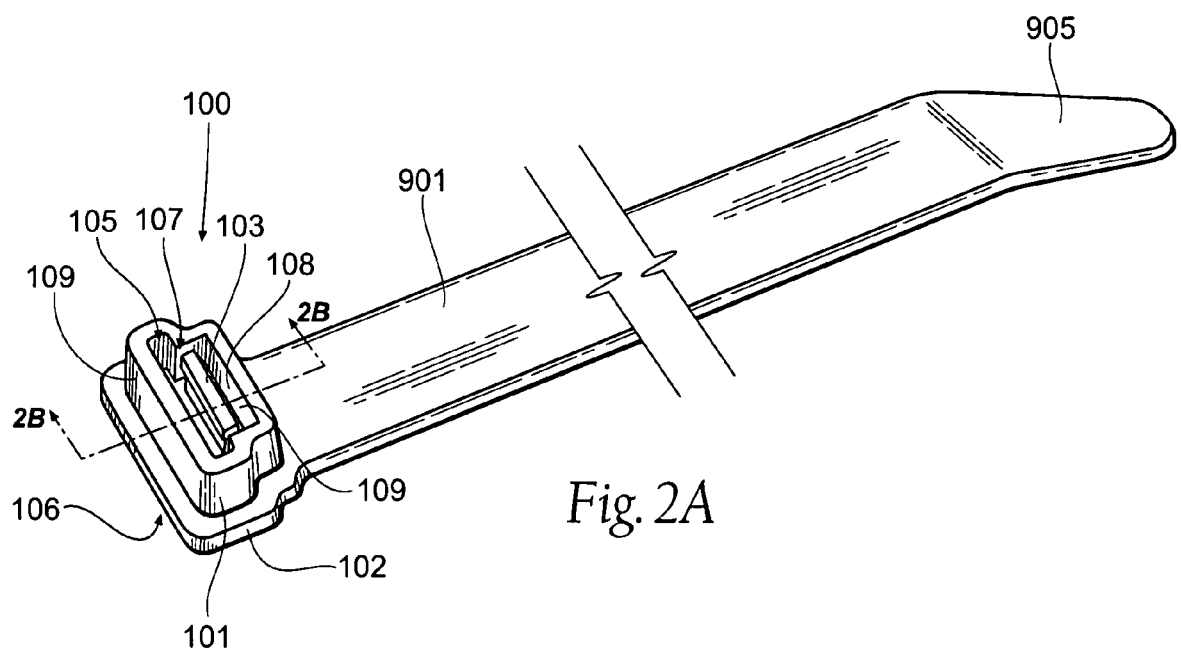
FIG. 2A is a perspective view of a first embodiment of the present invention.
Figure 1B:
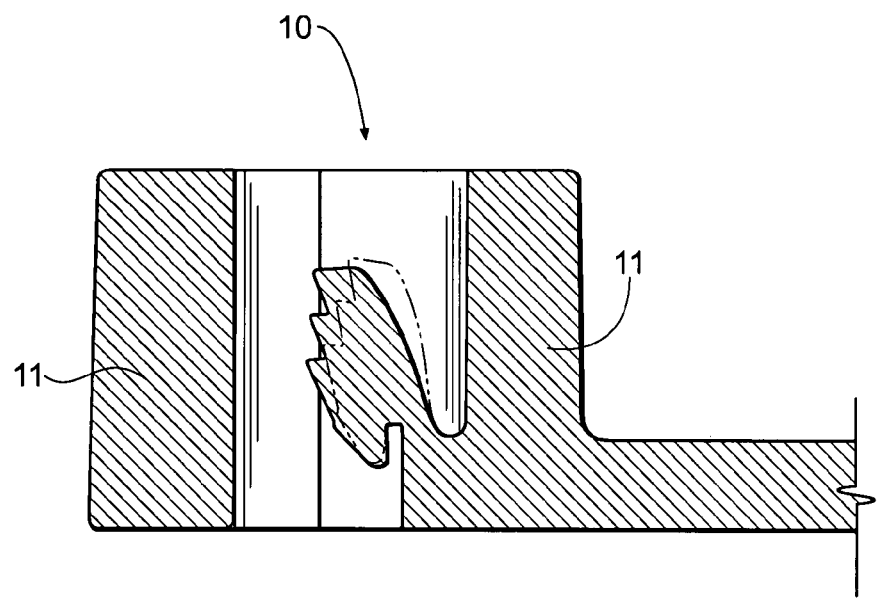
FIG. 1B is a cross-section view of the prior art tie head taken along line 1B-1B of FIG. 1A.

Referring to FIGS. 1A and 1B, a previous locking tie head 10 is shown. The relative mass of the tie head 10 is especially evident with reference to the solid molded sections 11. As previously described, such bulk adds cost in both raw material and processing time.

Referring to FIGS. 2A-D, a first embodiment of the invention includes a tie head 100 having a wall 101, a reinforcement rib 102, and a pawl 103. The wall 101 has a reduced cross section, an outer wall surface 109 and an inner wall surface 108, which circumferentially forms an opening 105 having an entrance 106 and an exit 107. Generally, the reinforcement rib 102 is attached to, or disposed on, the wall 101 outer surface 109, and the pawl 103 is attached to the wall 101 inner surface 108 and is disposed at least partially in the opening 105 adapted to receive a free end 905 of a retaining strap 901. More specifically referring to FIG. 2B, the reinforcement rib 102 preferably encircles the wall 101, is preferably molded integrally with the wall 101, protruding from the wall outer surface 109 proximate the entrance 106 to the opening 105. In addition to integral molding with the wall 101, the reinforcement rib 102 further may be molded, merged and aligned with the tie strap 901. In this case, aligning the reinforcement rib 102 with the tie strap 901 provides 360 degrees of structural rib reinforcement encircling the tie head 100 which provides increased hoop strength around the tie head 100. This alignment also simplifies the mold cavity profile by eliminating the need for any cross slides in the molding process.

The head 100 is also preferably provided with clamping rails 104 near the entrance 106 to the opening 105. The rails 104 are adapted to interface to the bundled objects 900. When the strap 901 is sufficiently pulled through and tensioned the curved surface of the clamping rails 104 are drawn onto the bundle surface, filling in the 90 degree transition between inserted strap 901 and tie head entrance 106 that creates a contact gap, and thereby providing substantially 360 degrees of clamping force around the bundle's surface. While providing a complete clamping surface, the use of clamping rails 104 also allows the pawl 103 to be positioned closer to the entrance 106 to the opening 105, thereby allowing more material to be removed from the height of the walls 101 which subsequently lowers the overall profile of the entire tie head 100. When clamping rails 104 are used, it is preferable that the reinforcement rib 102 be placed proximate the entrance 106 of the opening 105 formed by the wall 101 thereby providing reinforcement for the clamping stresses.

Figure 2B:
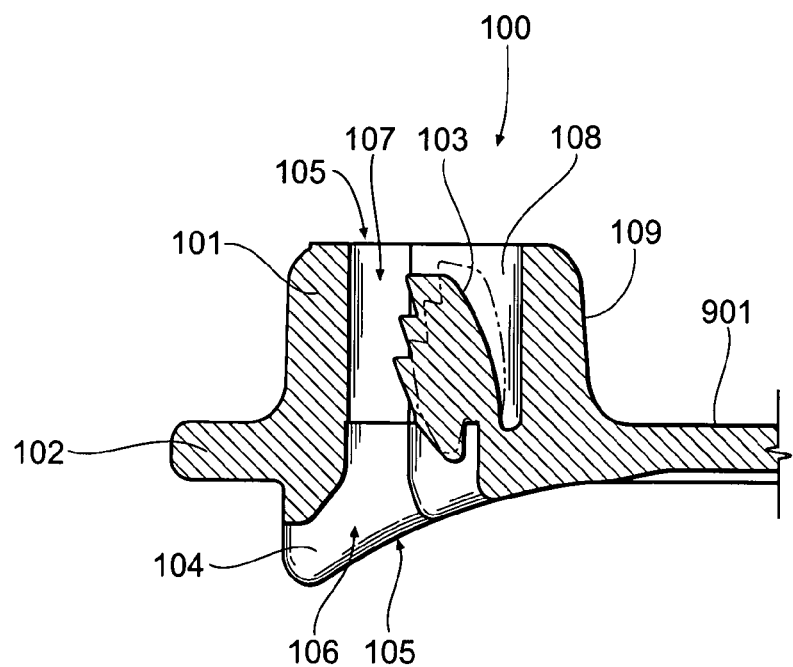
FIG. 2B is a first cross-section view taken along line 2B-2B of FIG. 2A.
Figure 2C:
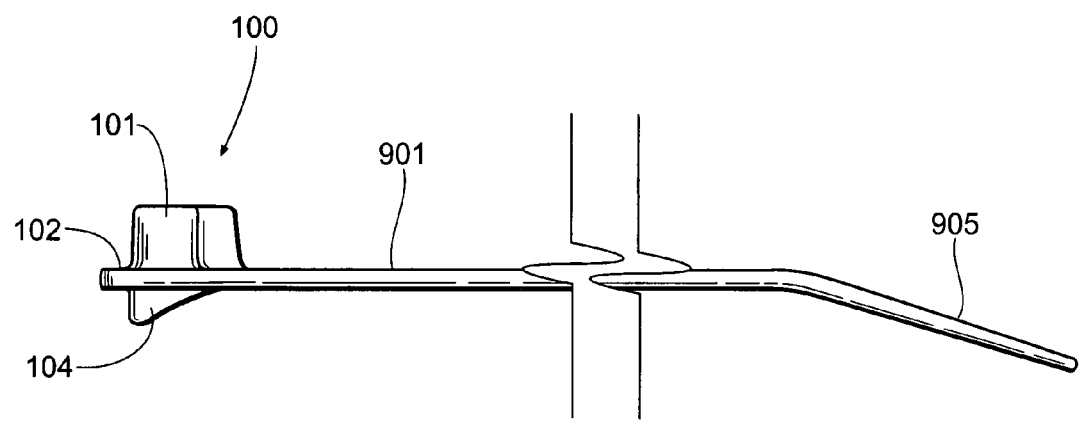
FIG. 2C is a front elevation view of the embodiment of FIG. 2A.
Figure 2D:
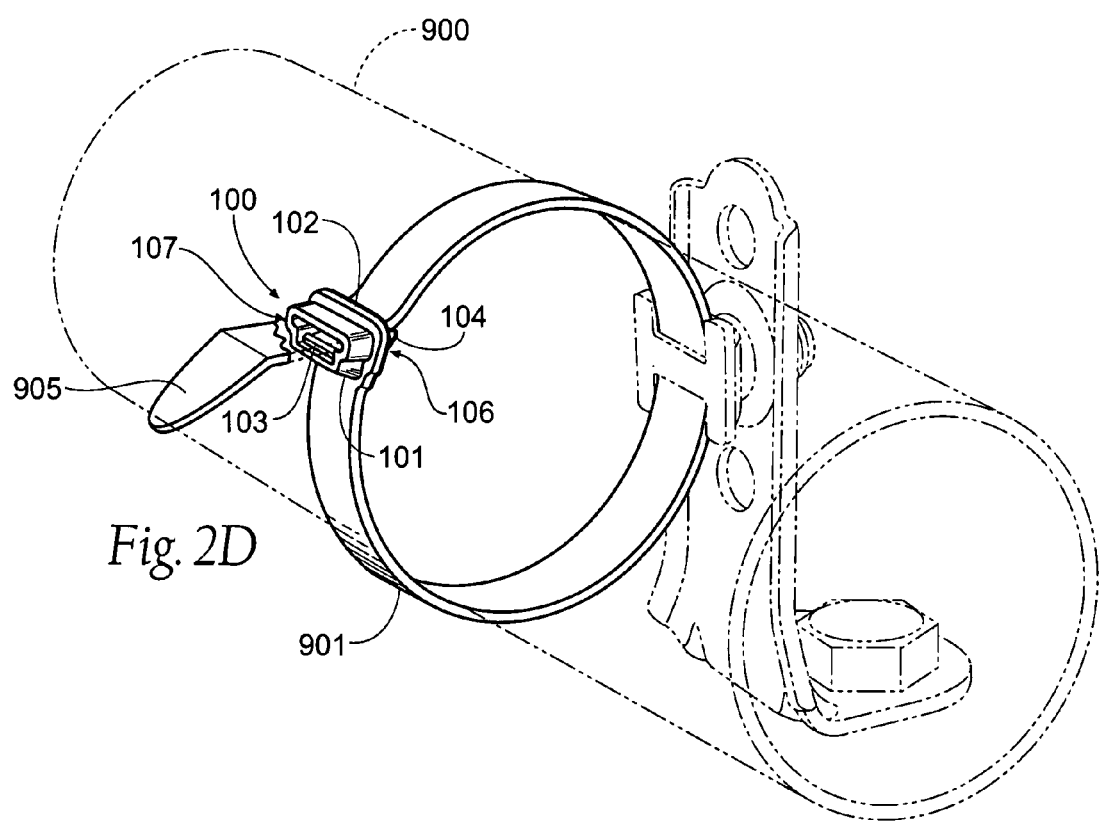
FIG. 2D is a perspective view showing the embodiment of FIG. 2A in use.
Figure 2E:
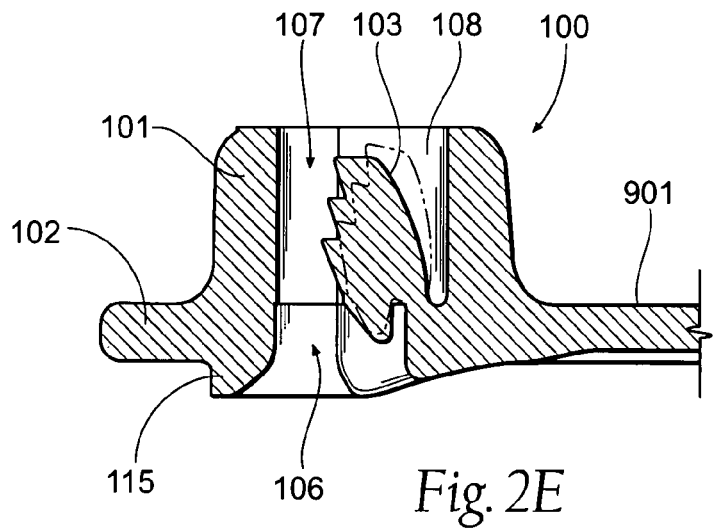
FIG. 2E is a first alternate cross-section view taken along line 2B-2B of FIG. 2A.

FIG. 2E depicts an alternate clamping bottom surface lacking the clamping rails 104 shown in FIG. 2B. Rather, this embodiment includes only a ridge 115 directed towards the bundled object.

Figure 2F:
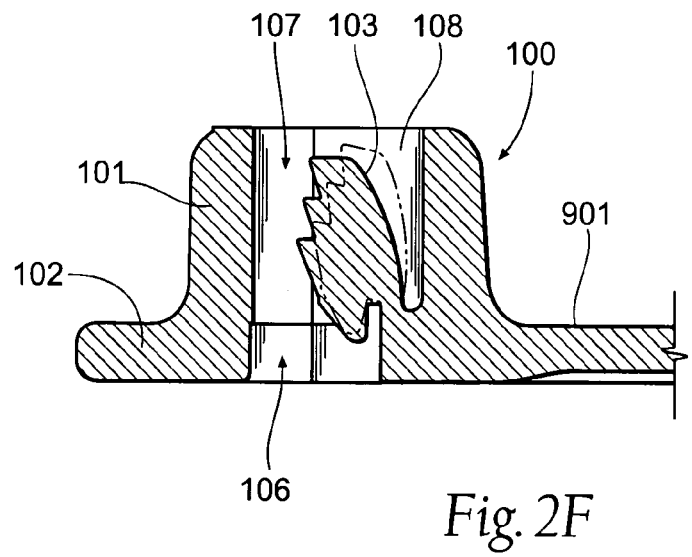
FIG. 2F is a second alternate cross-section view taken along line 2B-2B of FIG. 2A.
Figure 3:
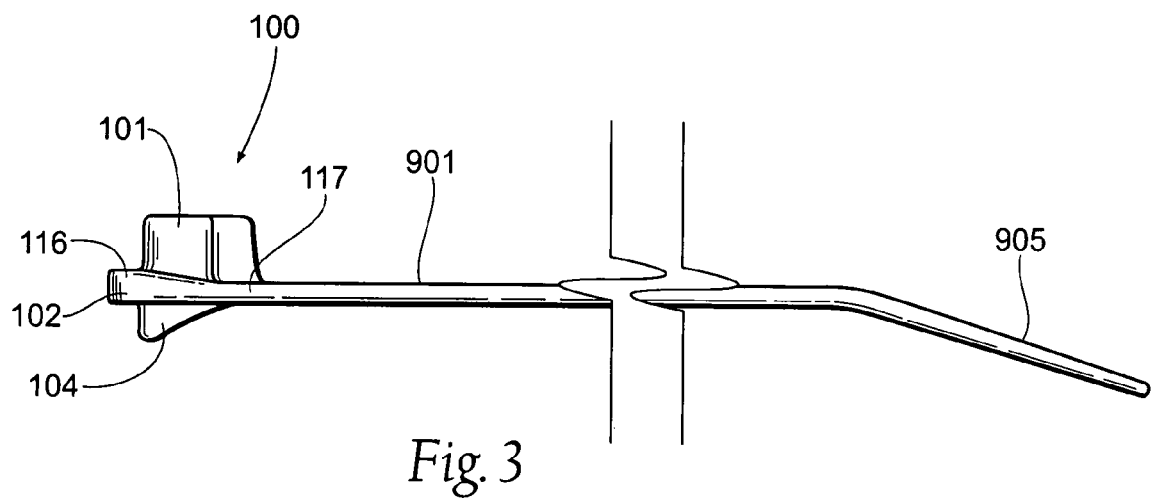
FIG. 3 is a front elevation view of an alternate first embodiment of the present invention showing an enhanced reinforcement rib.

FIG. 2F shows a second alternate embodiment having neither a ridge 115 as in FIG. 2E nor clamping rails 104 as shown in FIG. 2B.

Where clamping forces are generally high, the reinforcement rib 102 may, itself, require additional support at rib locations expected to deflect under higher forces. Reinforcement may come by way of a shouldered or thickened rib 102. That is, the rib 102 may be supplied with a reinforced rib section 116 to provide such additional support, as seen in FIG. 3. While the required thickness of the reinforced rib section 116 may depend upon a particular application, an increase of thickness by 25-50%, as compared to the thickness of the strap 901, has proven to add significant strength to the reinforcement rib 102 and ultimately the tie head 100.

Turning now to FIGS. 4A-4D, a second embodiment of the invention includes a locking tie head 100 having a similar wall 101 and reinforcement rib 102 structure to the first embodiment. This embodiment further includes a head retainer 110 in the form of a stud receiver 111. The stud receiver 111 may be formed with at least one pawl, but preferably two opposing pawls 114 adapted to engage threads or other ridges on a support stud 902. The head retainer 110 is preferably attached to, or formed integrally with, an extended portion 112 of the reinforcement rib 102 at a retainer attachment point 113.

The retainer attachment point 113 is generally either flexile or robust, depending upon the particular application. While the second embodiment of FIGS. 4A-4D provides a flexile connection 113, a third embodiment pictured in FIGS. 5A-5D has a robust retainer attachment point 123 between the stud receiver 111 and the reinforcement rib 102. While a flexile connection 113 could be formed of any desirable shape, the preferred connection 113 is a latitudinal groove formed on at least one surface of the extended portion 112. The groove preferably has a substantially semi-rectangular cross-section. Such a cross-section provides many flex points, thereby eliminating the focus of flex stress from a single point as may occur if the groove had a semi-circular cross-section. A purpose of a flexile attachment point 113 is that the head retainer mechanism may be used in a greater variety of situations. For example, referring back to FIG. 4C, if the retaining stud 902 did not have the lower standoff portion and the retainer 111 needed to be positioned nearer the support structure, the flexile connection 113 would allow placement of a large bundle close to the support structure, and would further allow slight movement in the head to allow insertion of the strap into the opening.

A fourth embodiment of the present invention is shown in FIGS. 6A-6D. This embodiment includes a locking tie head 100 having a similar wall 101 and reinforcement rib 102 structure to the first embodiment. This embodiment, like the second and third embodiments, has a head retainer 110, in the form of a stud receiver 121. This stud receiver 121, however, lacks the pawls of the other embodiments, and instead has a bore 124 adapted to engage a smooth or welding stud 906. Similar to the second embodiment, this embodiment has a flexile retainer attachment point 113, which connects the head retainer 110 to the extended portion 112 of the reinforcement rib 102.

A fifth embodiment is depicted in FIGS. 7A-7D. This embodiment includes a locking tie head 100 having a similar wall 101 and reinforcement rib 102 structure to the first embodiment. Further, this embodiment has a similar head retainer 110 to the fourth embodiment. However, this embodiment includes a robust retainer attachment point 123.

Now referring to FIGS. 8A-8D, a sixth embodiment of the invention includes a locking tie head 100 having a similar wall 101 and reinforcement rib 102 structure to the first embodiment. Similar to the second and third embodiments, this embodiment includes a head retainer 110. However, this embodiment provides retention by mounting into a hole or slot 903, rather than on a support stud 902. To provide retention into a hole or slot 903, the head retainer 110 is in the form of a supporting snap structure or arrowhead 131 which is generally known in the art.

A seventh embodiment of the present invention is depicted in FIGS. 9A-9D. This embodiment includes a locking tie head 100 having a similar wall 101 and reinforcement rib 102 structure to the first embodiment. Similar to the sixth embodiment, the head retainer 110 allows support through a hole or slot 903. However, this embodiment utilizes a fir tree structure 141 for the head retainer 110. The fir tree structure 141 is generally known in the art.

Another embodiment is disclosed in FIGS. 10A-10D, which incorporates as a head retainer 110 a second locking tie head 151. The second tie head 151 is preferably of the same general structural design as described herein, having a wall 201 circumferentially defining an opening 205, a reinforcement rib 202 disposed on the wall 201 and a pawl 203 disposed at least partially within the opening 205. Such a head retainer 110 allows a secured bundle 900 to be secured to an anchor or miscellaneous object (not shown) that does not provide a standard support stud 902 or slot 903. The second tie head 151 is preferably inverted with respect to the first tie head 101. In this manner, it is possible to utilize a single flexible tie to wrap around a first object 900, through the first tie head 101, around a second object 900, and through the second tie head. This embodiment provides separation and spacing between parallel and nearly parallel bundles.

Figure 10A:
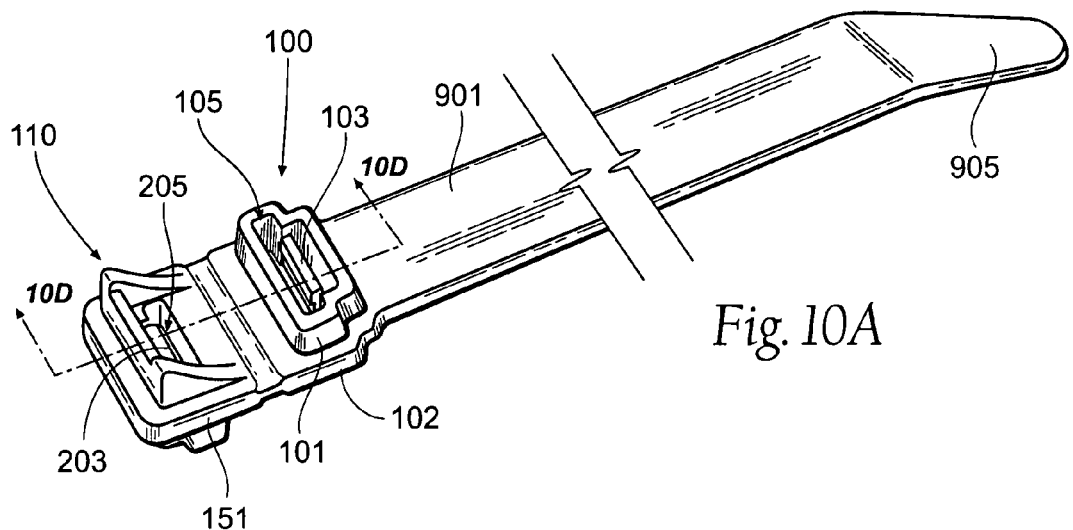
FIG. 10A is a perspective view of an eighth embodiment of the present invention.
Figure 10B:
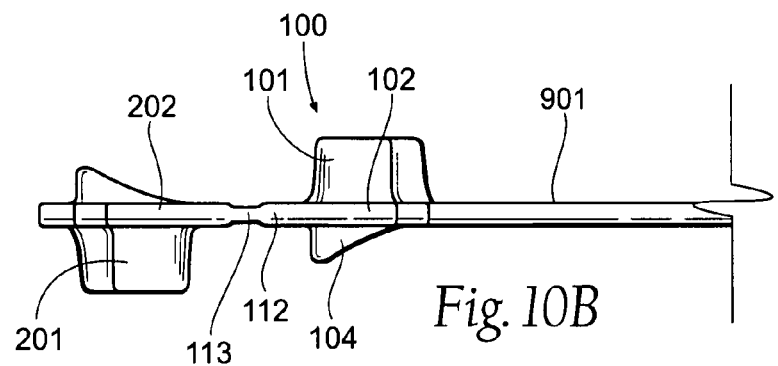
FIG. 10B is a front elevation view of the embodiment of FIG. 10A.
Figure 10C:
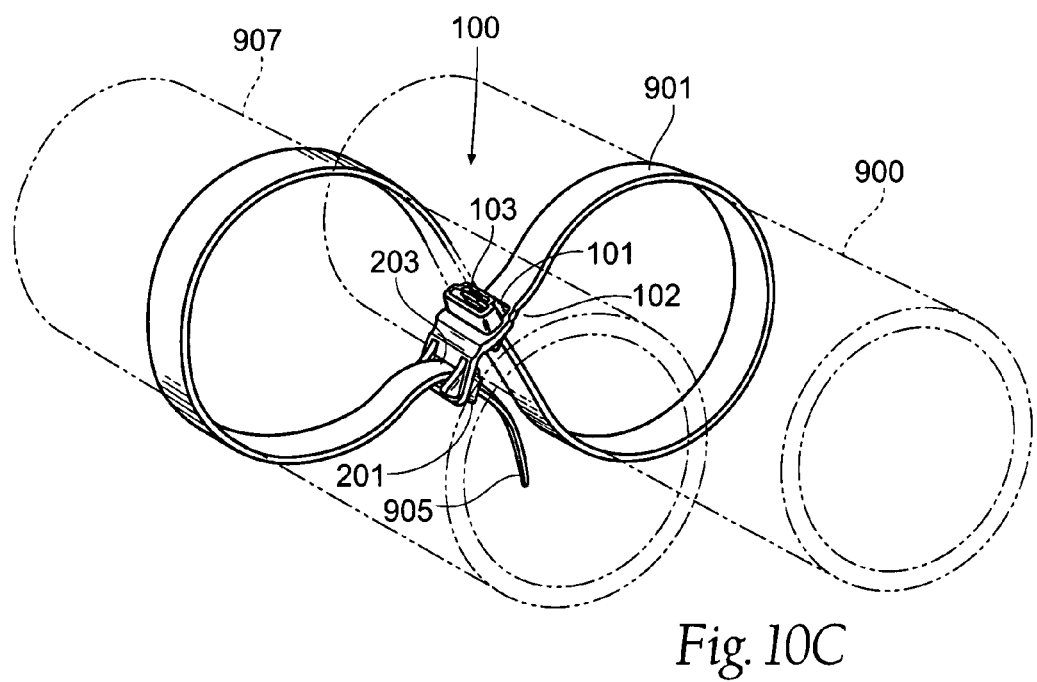
FIG. 10C is a perspective view showing the embodiment of FIG. 10A in use.
Figure 10D:
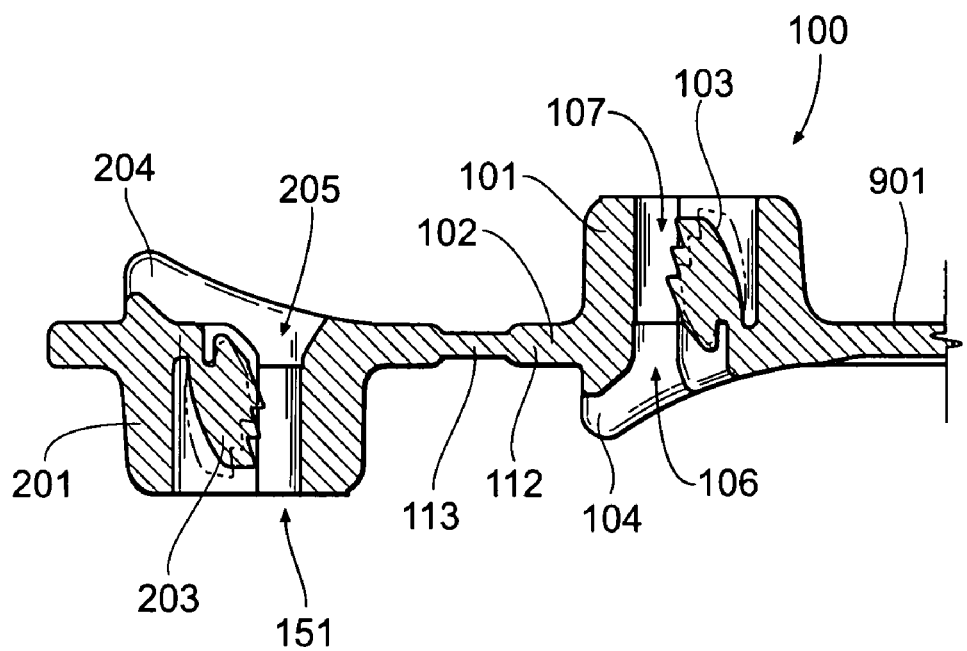
FIG. 10D is a cross-section view taken along line 10D-10D of FIG. 10A.
Figure 10E:
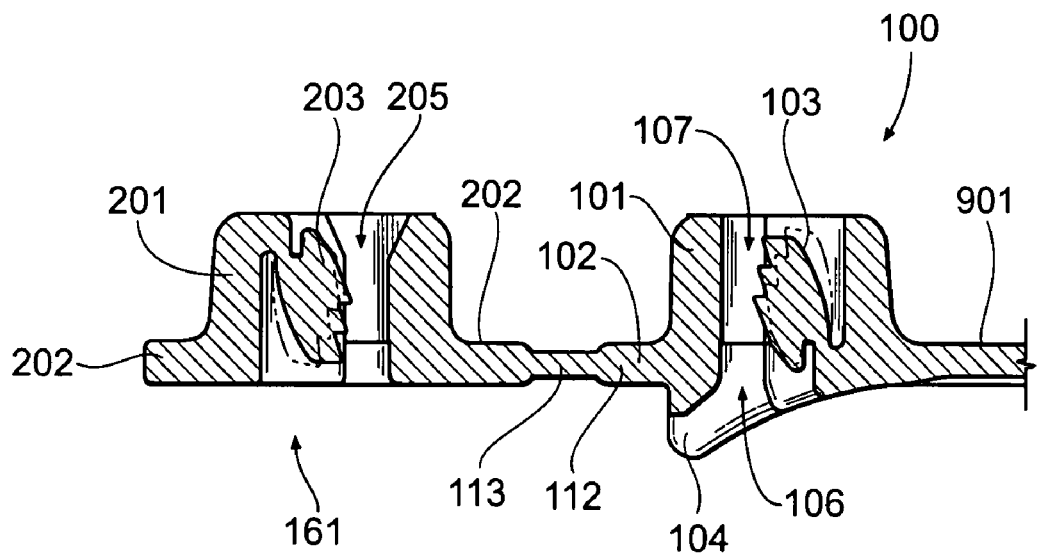
FIG. 10E is a cross-section view of a first alternate tie element having a locking tie head for a head retainer, similar to that shown in FIG. 10D.

A cross-section view of a first alternate embodiment having a second locking tie head 161 for a head retainer 110 is shown in FIG. 10E. In this embodiment, the second tie head 161 is generally of a similar construction to the first tie head 100. The second tie head 161 is provided with a reverse pawl 203 similar to that in FIG. 10D, however, the reinforcement rib 202 of the second tie head 161 is positioned near the exit of the opening 205.

Figure 10F:
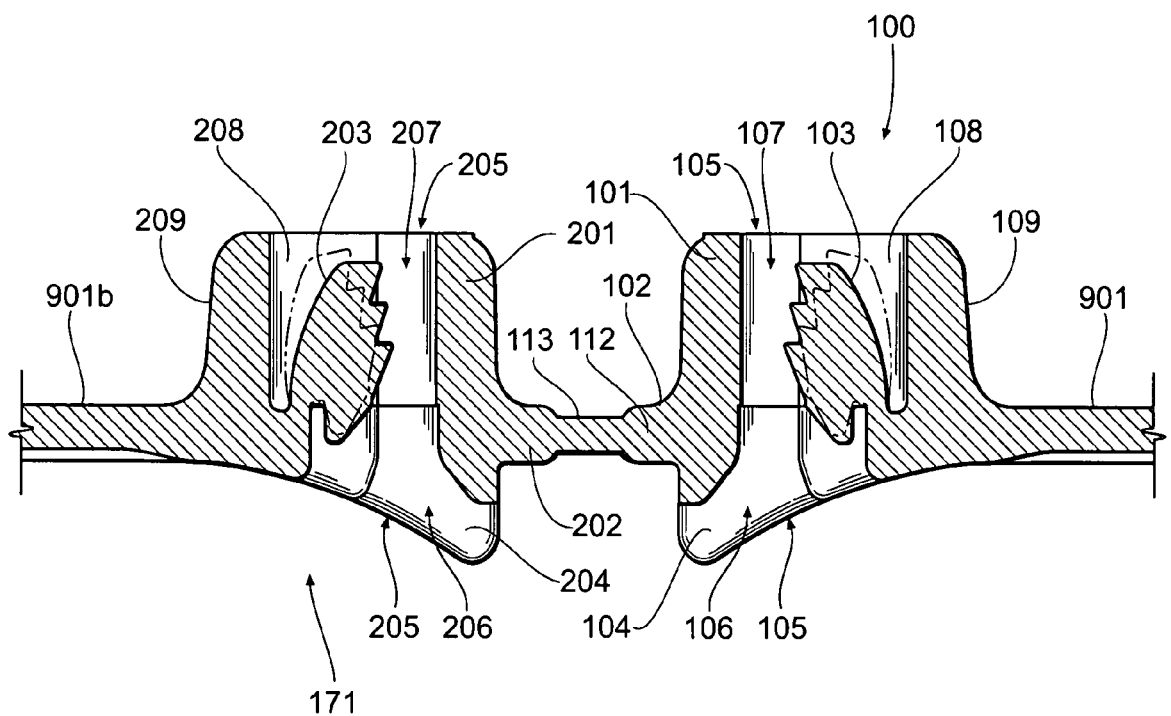
FIG. 10F is a cross-section view of a second alternate tie element having a locking tie head for a head retainer, similar to that shown in FIG. 10E.

FIG. 10F depicts a second alternate embodiment having a second locking tie head 171 for a head retainer 110. In this embodiment, however, the reinforcement rib 202 of the second tie head 171 may extend into a second flexible strap 901b for placement around an anchor, supporting structure, or second bundle.

The invention may be made from any methods and materials now known or developed hereafter. Standard methods for manufacture of such devices are generally known in the art and include, for example, resin molding.

To use the tie head 100, the head 100 is first supplied, or formed integrally, with a tie strap 901. The strap 901 is placed around an elongate object 900 to be held by the strap 901. The free end 905 of the strap 901 is inserted into the entrance 106 of the opening 105 and pulled through exit 107 of the tie head 100. If the tie head 100 is provided with clamping rails 104, and when the strap 901 is sufficiently pulled through and tensioned, the curved surface of the clamping rails 104 is drawn onto the bundle surface, filling in the 90 degree transition between inserted flexible strap 901 and tie head entrance 106 that creates a contact gap, thereby providing substantially 360 degrees of clamping force around the bundle's surface. When the rails 104 contact the elongate object 900 the force of the strapping action is distributed along the rails 104 and throughout the wall 101 and reinforcement rib 102. Then, if a head retainer 110 is provided, the head retainer 110 can be placed into or over the proper support structure; however, the head retainer 110 does not have to be applied last—it can be the first step in the installation followed by the insertion of the strap 901 into the tie head 100.

Figure 11A:
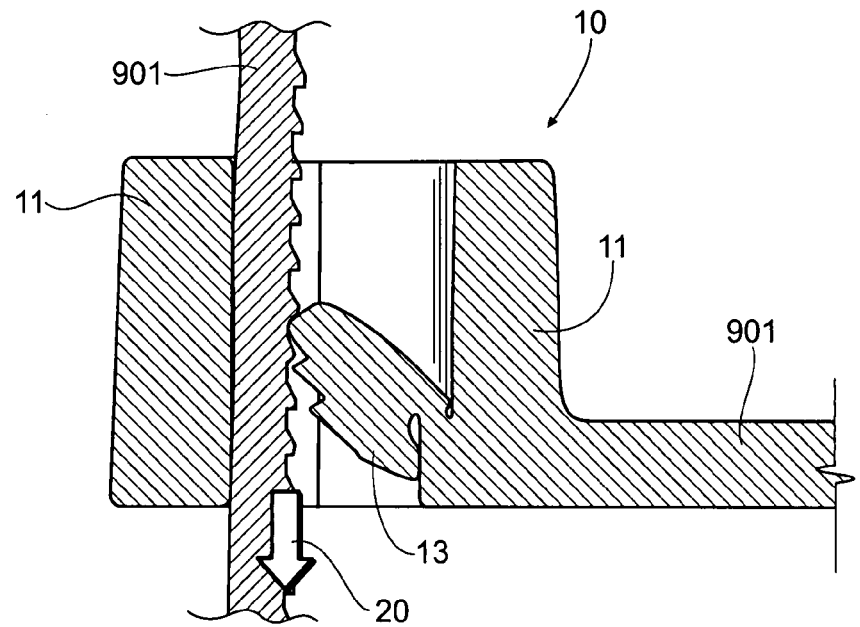
FIG. 11A is the cross-section view of the prior art tie head of FIG. 11B, further including an inserted strap at a first position.
Figure 11B:
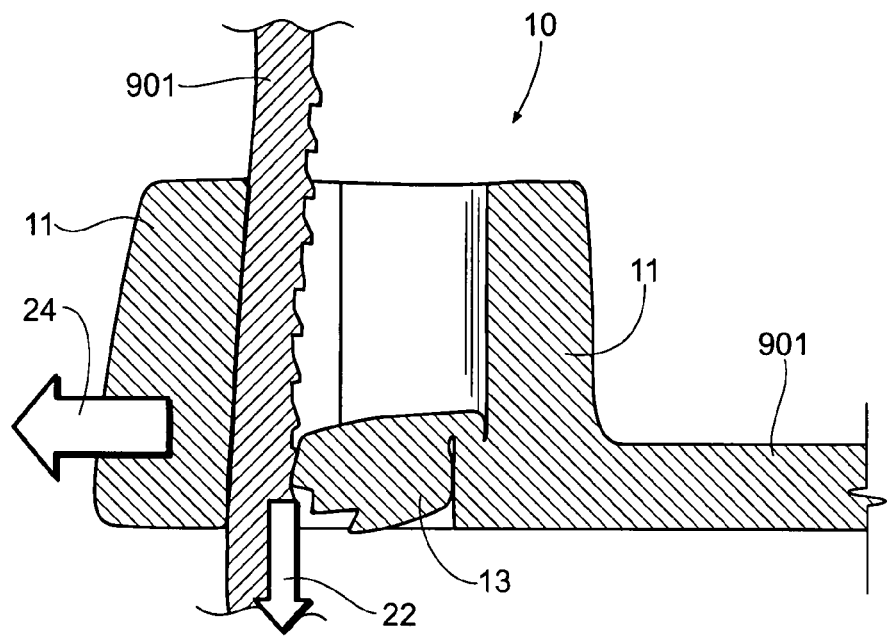
FIG. 11B is the cross-section view of FIG. 11A, wherein the strap is in a second position.

FIGS. 11A and 11B depict, in cross section, a performance issue with the prior art tie head 10 with strap 901 inserted. In FIG. 11A, the strap 901 is engaged with the pawl 13 and an average load 20 is applied to bundle 900 resulting in the strap 901 attempting withdrawal from the tie head 10 while the wedged pawl 13 presses strap 901 against inner wall surface 108. Note the positioning of the pawl 13 pressing against the strap 901 with the average load 20 applied to bundle 900 and strap 901 in FIG. 11A. On the other hand, note the positioning of pawl 13 as shown in FIG. 11B; when an increased force 22 is applied to the strap 901, the wall 11 fails by bowing outward 24. This undesirable wall deformation 24 allows the withdrawing strap 901 to slide between the pawl 13 and the bowed wall 11, thereby releasing a previously fastened bundle 900.

The aforementioned increased loading 22 of bundles 900 commonly occurs in but is not limited to bundles on heavy equipment and trucks bouncing in transit resulting in bundled harnesses jostling up and down applying shaking impact loads to all mounted and bundled flexible ties, bundles of large pulsating hydraulic lines, and bundles of expanding soft flexible pressurized hoses.

If, in attempting to achieve a reduction in material usage and cure time with the prior art locking tie head 10, the thickness of the wall 11 is reduced, deformation 24 is only exacerbated.

Figure 12A:
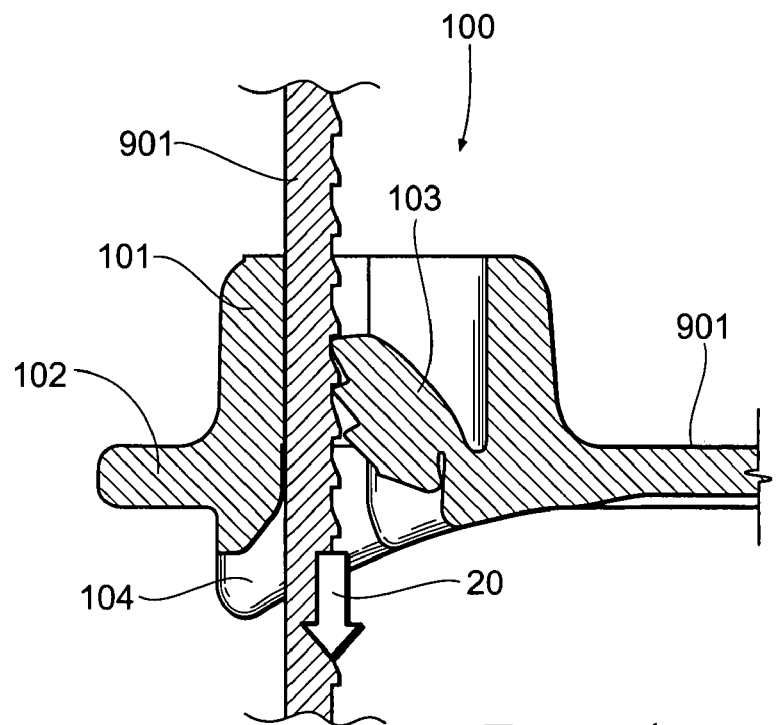
FIG. 12A is the cross-section view of FIG. 2B, further including an inserted strap in a first position.
Figure 12B:
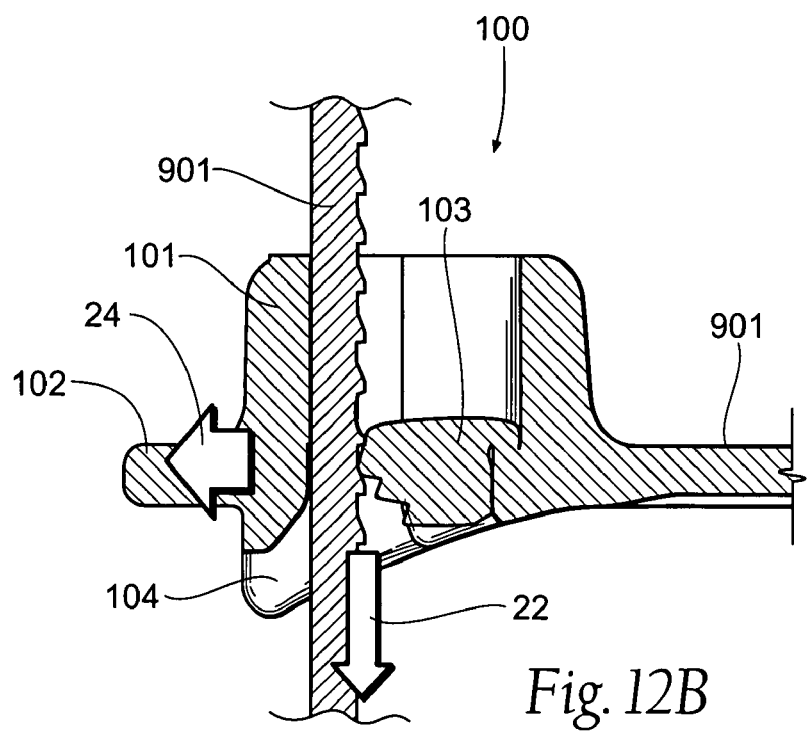
FIG. 12B is the cross-section view of FIG. 12A, wherein the strap is in a second position.

FIGS. 12A and 12B show operation of an embodiment of a tie head 100 according to the present invention in positions similar to those of FIGS. 11A and 11B. FIG. 12A depicts a strap 901 engaged with a pawl 103 with moderate or average clamping force 20. FIG. 12B shows the new tie head 100 under the same increased force 22 as that applied in FIG. 11B to a prior art head 10. Note that wall deformation or bowing 24 is significantly reduced and may be eliminated by using the reinforcement rib 102, which may be further aided by the clamping rails 104. Not only does the new tie head 100 prevent the aforementioned problem with bowed walls, but the head 100 is formed with walls 101 having a decreased cross-section. Therefore, the new tie head 100 allows a reduction in tie head material, thereby decreasing cure time and lowering production cost while providing a tie head having increased strength over prior art heads.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A tie head for a cable tie having a strap, the tie head comprising:
a wall circumferentially defining an opening;
the wall having a top edge and a bottom edge;
a reinforcement rib disposed circumferentially around the wall between the top edge and the bottom edge;
a pawl operatively connected to the wall, the pawl being at least partially disposed in the opening;
the opening having an entrance for receiving the strap;
a bottom surface surrounding the opening entrance; and
at least one clamping rail disposed on the bottom surface adjacent the opening entrance.

2. A tie head comprising:
a wall circumferentially defining an opening;
the wall having a top edge and a bottom edge;
a reinforcement rib disposed circumferentially around the wall between the top edge and the bottom edge;
a pawl operatively connected to the wall, the pawl being at least partially disposed in the opening;
the opening having an entrance for receiving a strap;
a bottom surface surrounding the opening entrance;
at least one clamping rail disposed on the bottom surface adjacent the opening entrance; and
wherein the reinforcement rib extends outwardly substantially straight from the wall in at least one direction to form the strap, the strap having a free end adapted to be inserted into the opening.

3. A tie head comprising:
a wall having an inner surface and an outer surface, the wall inner surface circumferentially defining an opening having an entrance and an exit;
a reinforcement rib disposed circumferentially around and on the outer surface of the wall closer to the entrance to the opening than to the exit; a pawl operatively coupled to the wall and disposed at least partially in the opening;
the reinforcement rib extending outwardly substantially straight from the wall in at least one direction to form a strap, the strap having a free end adapted to be inserted into the opening; and
at least one clamping rail disposed on a bottom surface of the wall adjacent the entrance.

* * * * *